United States Patent

[11] 3,610,301

| [72] | Inventor | Bertram L. Jordan |
| | | Lewiston, N.C. |
| [21] | Appl. No. | 28,660 |
| [22] | Filed | Apr. 15, 1970 |
| [45] | Patented | Oct. 5, 1971 |
| [73] | Assignee | Harrington Manufacturing Company, Inc. |
| | | Lewiston, N.C. |

[54] TREE-FELLING DEVICE
1 Claim, 11 Drawing Figs.

[52] U.S. Cl. .................................................... 144/34 E,
143/32 N, 144/309 AC
[51] Int. Cl. ...................................................... A01g 23/02
[50] Field of Search .......................................... 143/32 N;
144/2 Z, 3 D, 34 R, 34 A–34 E, 309 AC

[56] References Cited
UNITED STATES PATENTS

| 3,074,447 | 1/1963 | Bombardier ................. | 144/3 D |
| 3,140,736 | 7/1964 | Propst ......................... | 144/34 R |
| 3,364,960 | 1/1968 | Collins et al. ............... | 143/32 N |
| 3,517,711 | 6/1970 | Reeser et al. ................ | 143/32 N |

*Primary Examiner*—Gerald A. Dost
*Attorney*—Fred C. Philpitt

ABSTRACT: A tree-felling device employing a combination of a shear blade member and a saw chain member, said members acting in sequence upon opposite sides of a tree trunk in order to effect felling of the tree with a minimum of damage to the tree fibers.

TREE-FELLING DEVICE cl. BACKGROUND

Within the past 10 years, and particularly within the past 5 years, lumbermen and loggers have been provided with tree shear devices to facilitate the harvesting of timber. These tree-shearing devices are usually mounted on the front end of a tractor or skidder and consist of a fixed jaw member, a blade member that is adapted to be pivoted toward and away from said fixed jaw member, and hydraulically powered means (usually a piston and cylinder) for moving toward and away from said fixed jaw member. For example, one such device is that patented by Meece et al. and which is currently marketed by the Harrington Manufacturing Company under the name of "ROANOKE" tree shear. Another such device is manufactured by the Fulghum Manufacturing Company of Wadley, Georgia. Whereas these tree shears represent a valuable tool to loggers and lumbermen in that they save a great deal of labor and time, they have presented several problems insofar as a number of loggers and lumbermen are concerned.

First of all, some loggers feel that tree shears fell trees because the shear blade is in effect "compressing its way through the trunk of a tree." In other words, since most tree shear blades are wedge shaped in cross section (when considering the change in contour from the pointed leading edge to the much wider trailing edge) the wider trailing portion of the wedge-shaped blade must, in effect, be "pushed" into the trunk of the tree as the blade progresses through the tree trunk. One disadvantage of "pushing" is that it actually results in some compression of the sap that is present in the tree fibers adjacent to the cut. For instance, if the sap in the tree fibers above the cut is compressed upwardly into the fibers of the tree immediately above the line of the cut, the fibers into which such sap is compressed will be under a considerable stress to expand. This expansion stress may cause some immediate splitting or bursting of the fibers in the trunk above the cut area or, as is more usual, the splitting or bursting due to the stresses set up by the compacted sap will show up at some later time, and particularly while the lumber is curing or drying.

Another reason that loggers have been dissatisfied with tree shears is that as the shear blade nears the end of its stroke, the tree often begins to topple, and if it topples before the blade can get completely through the tree, then the final result will often be that one side of the tree will be "stripped" or "split" for a distance of from several inches to several feet, and some times such a "strip" or "split" extends as much as 10 or more feet up the side of the tree. This "splitting" of the tree decreases the value of the tree at the sawmill. In fact there are some small sawmill operators who will not even accept trees that have been cut with a tree shear because of the actual or hidden splitting that has occurred or which may occur.

OBJECTS

It is therefore a primary object of my invention to provide a new type of tree-felling device which will minimize or eliminate the types of compression, expansion, splitting and stripping that are briefly referred to above.

THE PRESENT INVENTION

Considered from one point of view, my invention involves the concept of using both a shear blade member and a saw chain member in a tree-felling device so that the cooperative functioning of these two members will minimize many of the problems and disadvantages that have heretofore been encountered with the use of a shear blade member alone.

Considered from one aspect my invention involves a tree-felling device comprising:

a. a shear blade member,
b. a saw chain member,
c. said shear blade member and said saw chain member being mounted for movement toward and away from each other through higher the same plane or parallel planes,
d. said shear blade member and said saw chain member in their most distant positional relationship providing a tree-receiving space therebetween for the reception of a tree trunk that will be at least partially within the operative cutting range of both said shear blade member and said saw chain member,
e. protective housing means for said saw chain member,
f. means for both moving said saw chain member out of said protective housing into said tree-receiving space and for retracting said saw chain member back into said protective housing, and
g. means for moving said shear blade member toward and away from said saw chain member.

THE DRAWINGS

Referring to FIGS. 1–6, F is the tree-felling assembly frame in which are mounted a shear blade member B and a saw chain member S. As shown, these members are mounted pivotally about the same axis A, the shear blade member B being movable through a limited arc by means of hydraulic piston and cylinder arrangement C. (A similar but smaller piston and cylinder arrangement, which is not shown in FIGS. 1–6, is provided for moving saw chain member S through a limited arc about axis A). The saw chain member is arranged to move from within the protective jaw member section P outwardly through an arc toward the shear blade member B.

Figure 1:
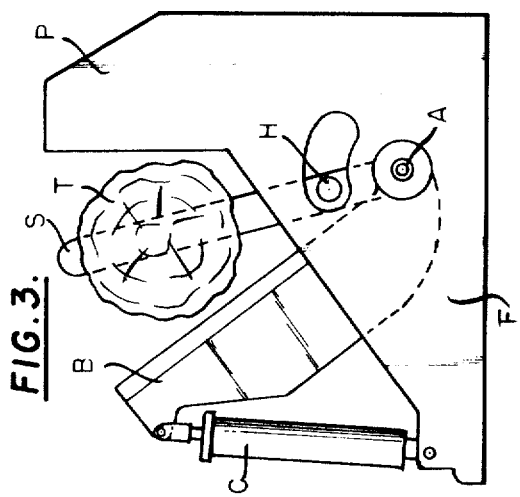

Referring now to FIG. 1, the tree-felling device is shown with the shear blade member B and the saw chain member S in their most distant positional relationship with respect to each other and providing tree-receiving space therebetween for the reception of a of trunk T that is to be cut.

Figure 2:
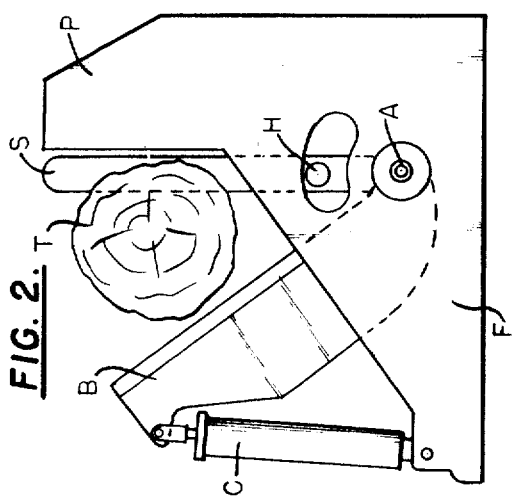

FIG. 2 illustrates the preferred first step of the tree-felling operation wherein the saw chain member S moves in a counterclockwise direction out of protective jaw member section P and into the right side of the tree trunk T. The saw chain of saw chain member S is preferably driven by a hydraulic motor H, but it may also be driven by any other type of motor means, such as a gasoline motor.

Figure 3:
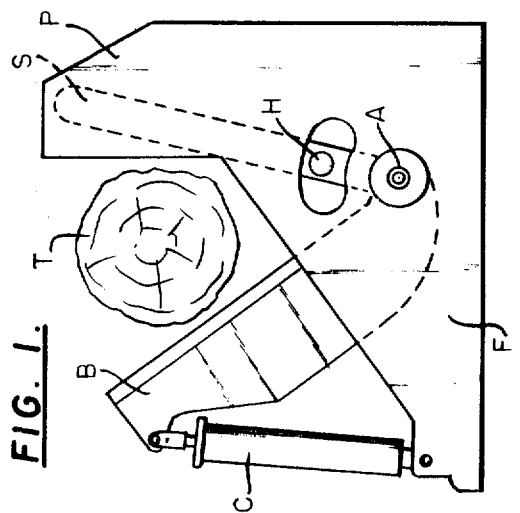
FIGS. 1–6 are simplified plan views of one tree-felling assembly in accordance with the present invention, and illustrate the preferred sequential operation of a shear blade member and a saw chain member in accordance with one embodiment of the invention.

FIG. 3 illustrates the progress of the saw chain member S through the tree trunk T to its most counterclockwise position and to its furthermost degree of cutting. The proportion of the tree which the saw chain member S cuts and penetrates may be varied by the operator depending upon such facts as the size of the tree being cut, the variety and hardness of the tree that is being cut, the slope of the ground upon which the tree is growing, etc. However, by way of general indication, it has generally been found desirable to have the saw chain member S cut through between about one-third and two-thirds of the tree. Very excellent results have been obtained when the saw chain member goes between one-half and two-thirds the way through the diameter of the tree trunk.

Figure 4:
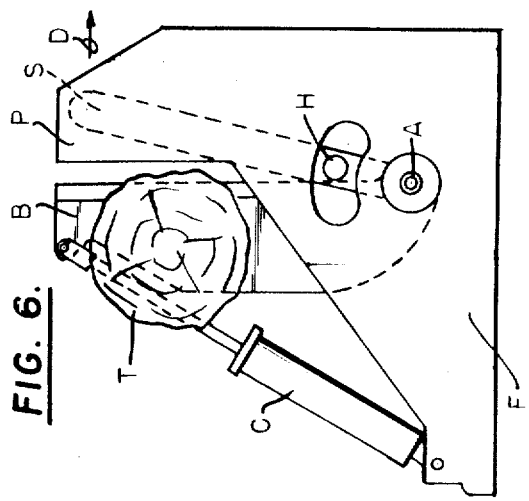

FIG. 4 shows that after the saw chain member S has completed the degree of cutting into the tree trunk which the operator desires, the operator then withdraws the saw chain member S back into the protective jaw section P which thus brings the saw chain member back to where it was at the very beginning (as shown in FIG. 1).

After the saw chain member S has been withdrawn into the protective jaw member P, the hydraulic cylinder piston C is activated so that the shear blade member B will begin to move in a clockwise direction and cut into the other side of the tree T. The shear blade member will go through an area of the tree trunk that generally corresponds to the area which was not cut by the saw chain member. The saw chain member S and the shear blade member B can be mounted so that they will either operate in essentially the same cutting plane or in parallel cutting planes. I have found it preferable to have the saw chain member and the shear blade member operate in parallel planes that are spaced between about 0.4 and 2.5 inches apart, the plane of the cut of the saw chain member being above that of the plane of the cut of the shear blade member. With this preferred arrangement, the remaining tree stump will be characterized by a "notch" or "wave" across a segment thereof.

Figure 6:
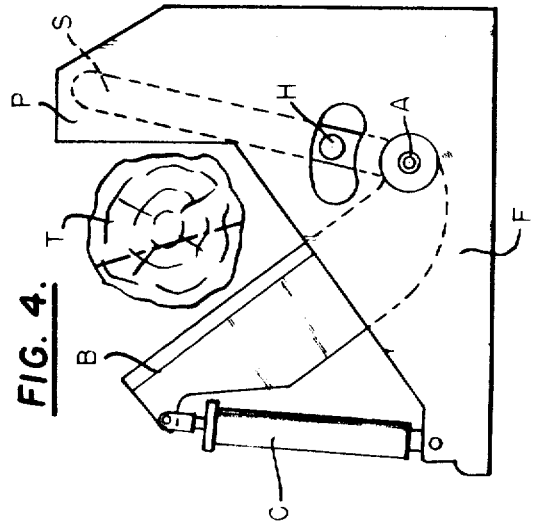

FIG. 6 shows the shear blade member in its fully extended position passing nearly entirely through the tree.

At this point it should be noted that since the shear blade member B has a cross-sectional configuration that is generally wedge shaped, the tree will usually begin toppling long before the shear blade member B gets to the fully extended position shown in FIG. 6. Due to the wedge-shaped cross-sectional configuration of the shear blade member B, the tree will usually topple in the direction indicated by arrow D in FIG. 6. Accordingly, whereas it appears in FIG. 6 that the piston of the cylinder and piston C is being wedged into the area made by the cut, this entry actually would never happen until after the tree has started to topple in the direction indicated by arrow D.

Whereas FIG. 4 shows that the saw chain member S is completely withdrawn into the protective jaw P before the shear blade member B begins its cutting stroke, skilled operators will sometimes find that they can actually begin the forward stroke of the shear blade member B while the saw chain member S is still being withdrawn, depending upon the size of the tree, the variety of the tree, etc. The primary consideration here, of course, is that the movement of the shear blade member B through the tree trunk should not cause the tree to pinch down upon the saw chain member S before it can be withdrawn into the protective jaw member B. Operators can gauge the cooperative movement of the members that will be most satisfactory after experience with a number of trees.

FIGS. 7-11 are more detailed drawings of a tree-felling assembly of the type shown in FIGS. 1-6, wherein the tree-felling assembly frame is seen to consist of upper plate 32, a lower plate 34 and intermediate spacing-reinforcing members 36 and 38; a shear blade member 40 pivoting about pivot member 42; 44 is a hydraulic piston and cylinder arrangement, pivotally connected to the shear blade member 40 at point 46 and pivotally connected to the frame assembly at 48; a saw chain member 52 composed of a saw chain 54, a saw bar 56, and an upper mounting plate 58 for the saw bar 56, said upper mounting plate 58 (together with a cooperating lower mounting plate 60) being pivotally mounted on pivot member 42; a hydraulic motor 62 with a drive shaft 64 and drive sprocket 65 for driving the saw chain; an elongated arcuate slot 66 so that the hydraulic motor 62, which extends above upper plate 32, can move through a limited arc as the saw chain member moves through an arc; a hydraulic piston and cylinder 68 (indicated only in FIG. 7) located between plates 32 and 34, pivotally mounted to the assembly frame by a pivot pin 70 and pivotally attached to the upper mounting plate at 72; frame mounting plates 74 and 76 for pivotally attaching the frame assembly to a vehicle; a deflecting bar 78 for deflecting falling trees, and; an upstanding member 80 which serves the dual purpose for attaching a frame assembly lift cylinder 98 and as a secondary deflecting means for falling trees.

A feature which is believed to be of particular novelty and utility in accordance with the present invention is the inertia wheel 82 that is interconnected to the hydraulic motor 62 by means of shaft 84. It has been found that this inertia wheel results in more reliable operation of the saw chain member, because when the saw chain member would otherwise have a tendency to catch or stop during its progress through the tree, the inertia wheel tends to supply an added increment of force to keep the saw chain going.

Figure 5:
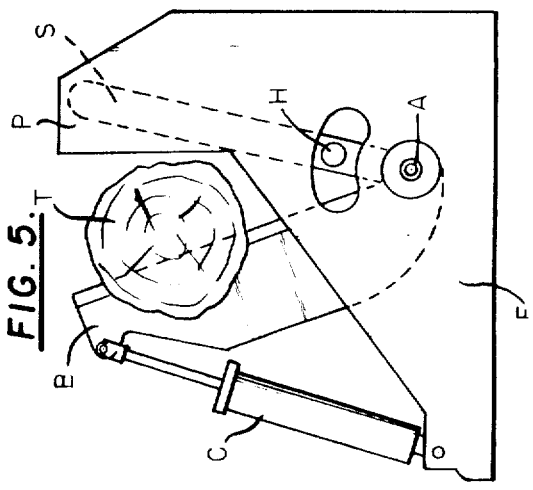
Figure 7:
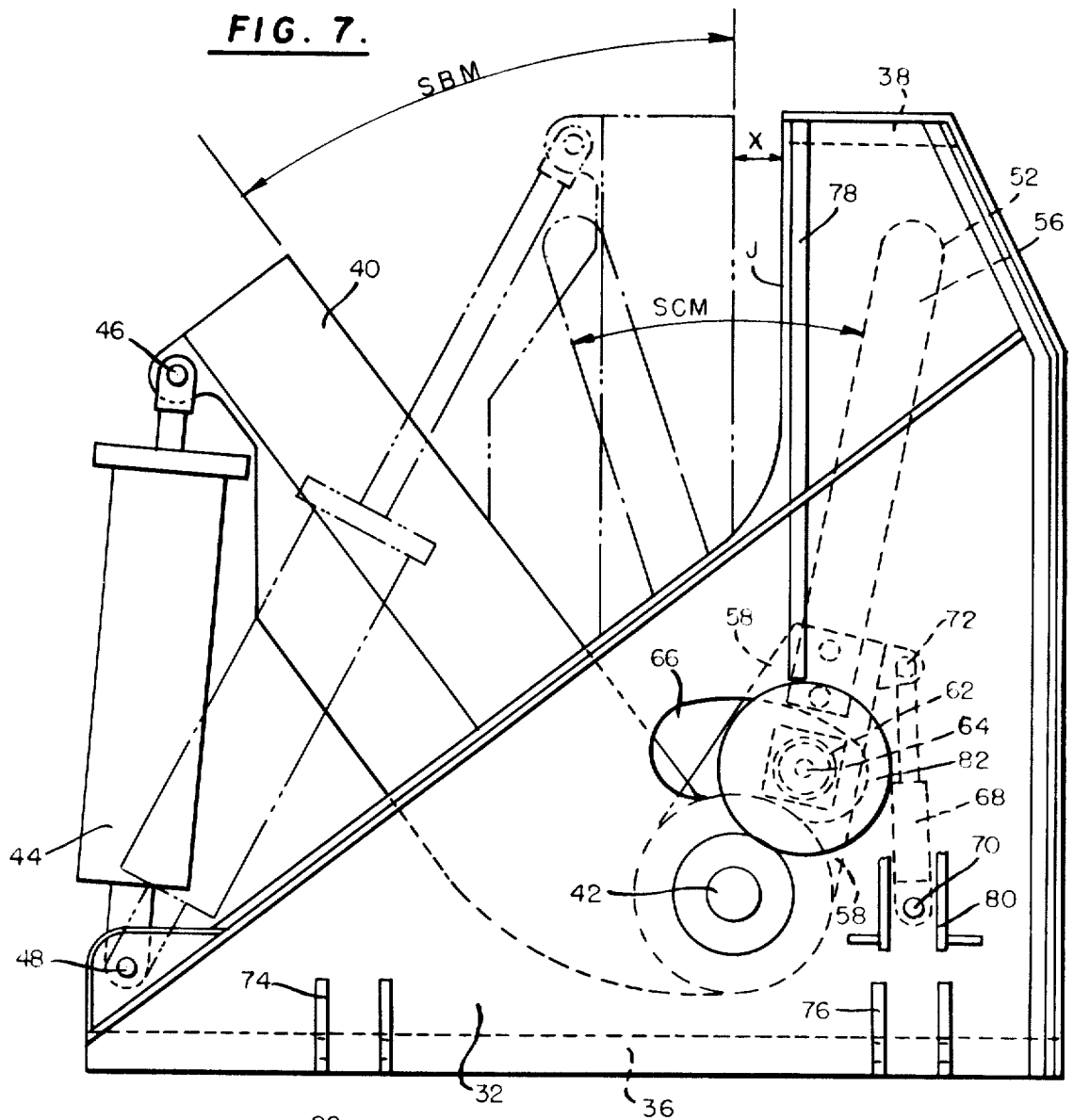
FIG. 7 is a more detailed plan view of a tree shear in accordance with this invention.

FIG. 7 illustrates that the saw chain member can be moved through the arc SCM and the shear blade member can be moved through the arc SBM. It will also be noted that the forward ends of spaced-apart plates 32 and 34 form a protective jaw within which the saw chain member 52 can be housed and protected. This protection is primarily necessary for the relatively delicate saw chain member 52 during and after the tree has toppled over. The cut end of a toppled tree often bounces around several times before coming to rest, and in the course of this battering the saw chain member could easily and quickly be battered into an inoperable condition unless protected. Thus, once the saw chain member 52 has done its job (as indicated by FIGS. 2 and 3) and has withdrawn (as shown in FIG. 4-6) into the protective jaw, composed of heavy steel-plate, it is practically impossible for a toppling tree to harm it. The shear blade member is made of strong thick steel, and for this reason alone is not likely to be harmed by the bouncing cut end of a toppled tree. Moreover, as is perhaps best indicated in FIG. 6, when the shear blade has reached the end of its stroke, the blade is in effect supported by the cut stump beneath it. Accordingly, even if the cut end of a toppling tree should bounce and then slam down on the shear blade, the possibility of damage is less because of the firm manner in which it is supported.

Although the pivot point 42 for the saw chain member 52 and the shear blade member 40 are shown to be the same, they could be different. If the pivot point is the same it is easier to move both the shear blade and the saw chain member so that the final lines of cut of the two cutting elements either coincide or overlap.

In accordance with a preferred embodiment of this invention the tree-cutting device that I have devised differs from the usual tree shear device in one other respect in that when the tree shear blade has been extended through its full arc (to its position) it will still not be abutting against the protective jaw member. Instead, it will be some distance "$x$" away from the protective jawline "J" (for instance, in the order of 3 to 6 inches). Thus, this means that even when a tree is initially lodged between the angle that exists between the protective jawline "J" and the shear blade in its openmost position, and the shear blade was moved through its full arc, it would not pass completely through the tree. A great advantage of such an arrangement is that it permits a given-sized blade to cut down (in conjunction with the saw chain member) larger trees than the blade by itself might otherwise be able to fell. Accordingly, a tree-felling device constructed in accordance with my invention may have the same general overall dimensions of the prior art tree shears, particularly as far as length and width are concerned, but my tree-felling unit can cut down larger trees.

Figure 8:
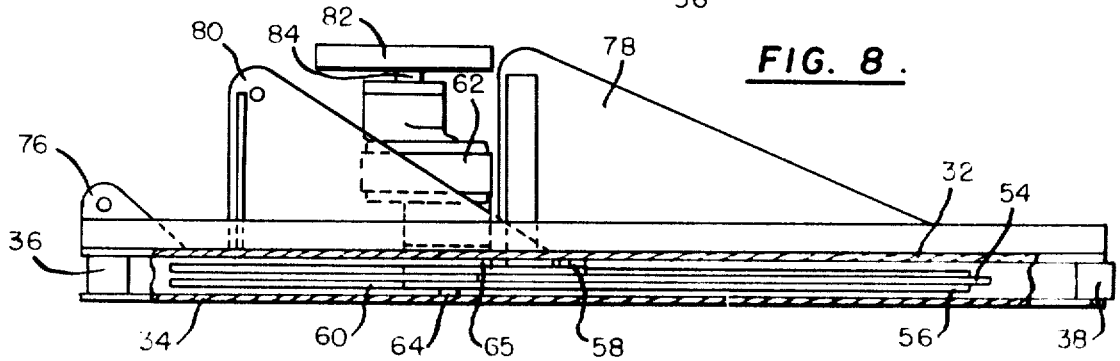
FIG. 8 is a side view of the shear shown in FIG. 7, but excluding any showing of the means for moving the saw chain member.
Figure 9:
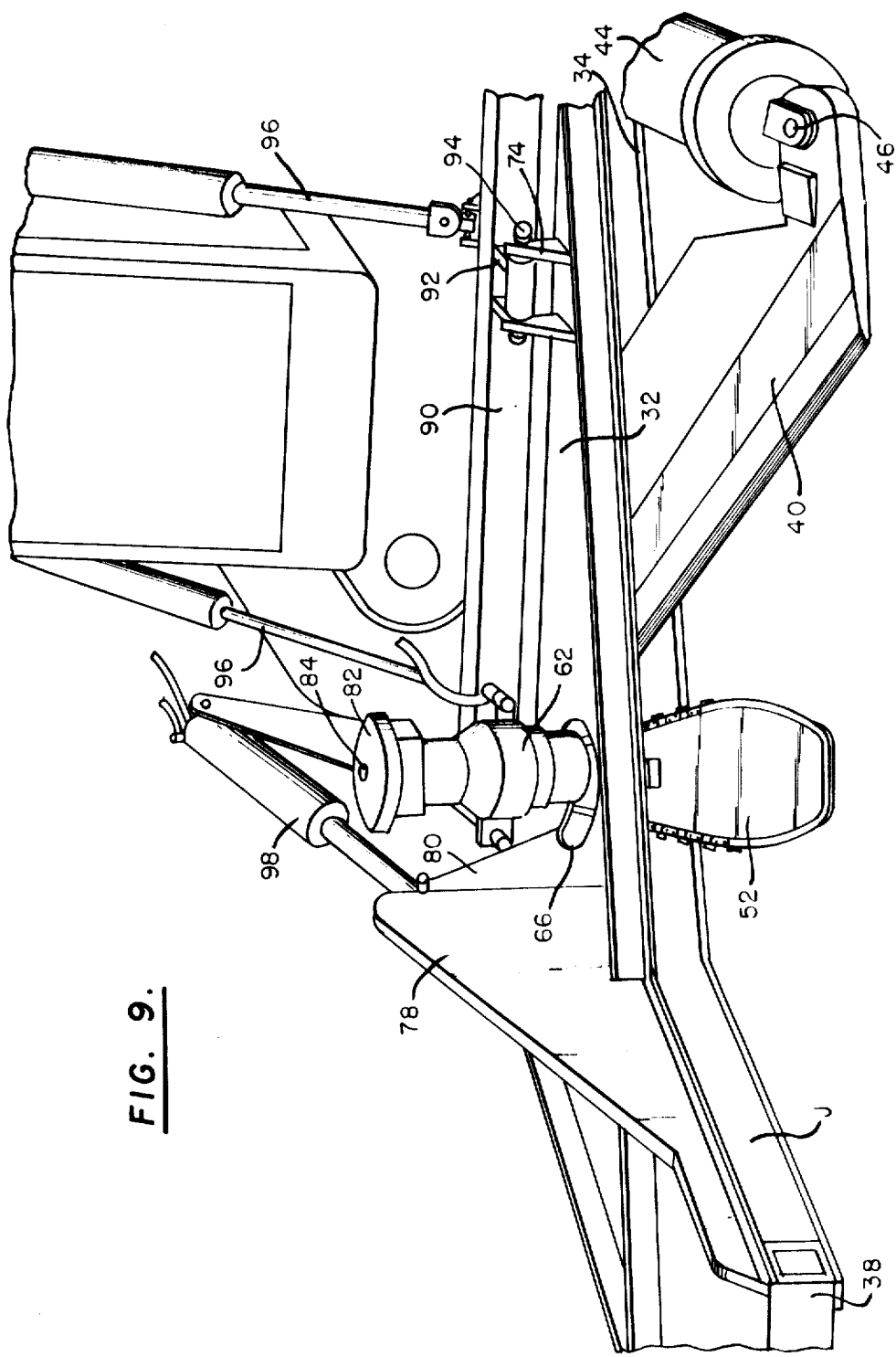
FIG. 9 is a front perspective view of a tree shear in accordance with this invention which is substantially the same as the shear shown in FIGS. 7 and 8.

FIG. 9 shows substantially the same machine as is shown in FIGS. 7 and 8, but from a front perspective view. In FIG. 9, the saw chain member 52 is shown at approximately the end of its arcuate movement, and the shear blade member 40 is in its retracted position and has not yet begun its arcuate movement. In this view the entire tree-felling assembly frame is shown as being mounted on a beam 90 by means of the frame mounting plate 74, a corresponding mounting plate on the beam, and a pin 94. Beam 90 is of the same nature and has component $14 in FIGS. 1 and 2 of Meece et al. U.S. Pat. No. 3,327,745 and this beam is supported on the front of the end of a tractor in the same manner as is indicated in the Meece et al. patent. One or more hydraulic cylinders and pistons 96 may be employed to lift the beam 90, or a piston and cylinder of the type indicated by component 19 in the Meece et al. U.S. Pat. No. 3,327,745 may be used. FIG. 9 also illustrates a piston and cylinder arrangement 98, having one end interconnected to the beam 90 or its associated parts and the other end connected to the tree-felling assembly frame so that the tree-felling assembly frame can be pivoted through an arc with respect to beam 90. Since the manner of mounting a tree-felling assembly frame is generally old in the prior art, further details are not presented here. The present invention primarily resides in the particular construction of the tree-felling assembly frame and its cutting members.

Figure 10:
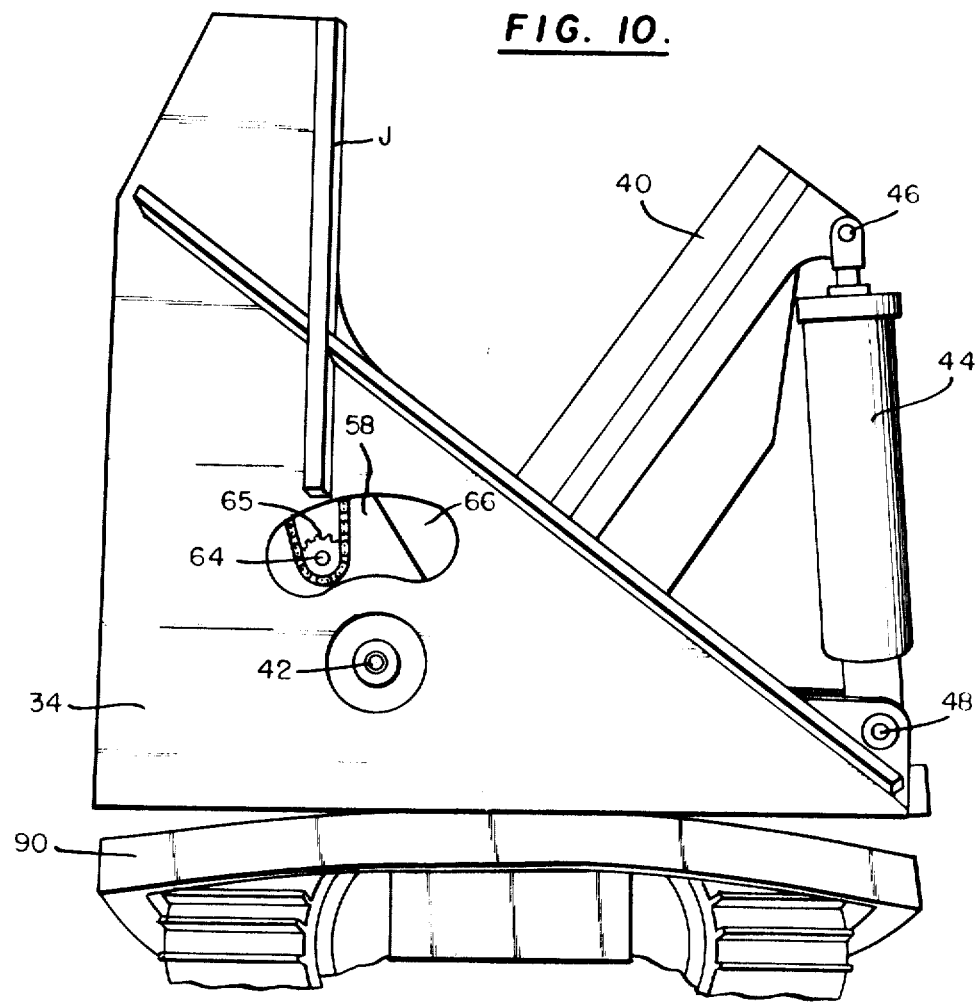
FIG. 10 shows the type of shear shown in FIGS. 7–9 except that the shear is shown in a raised or folded-back position.
Figure 11:
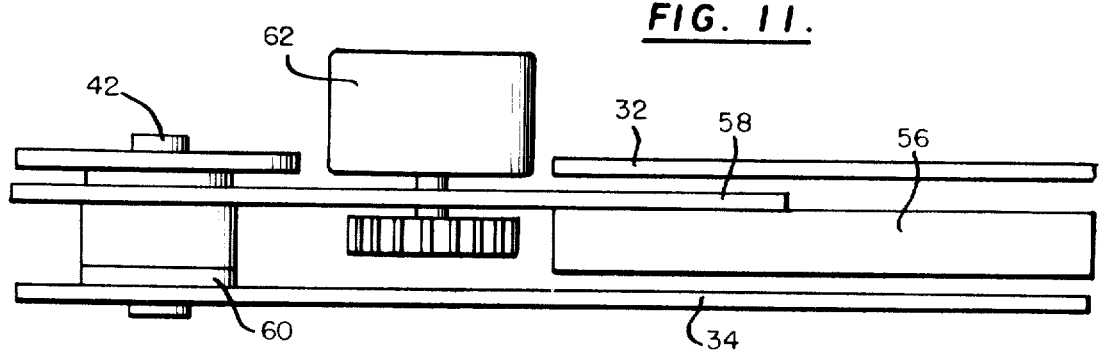
FIG. 11 is an enlarged and simplified view of certain components that are most clearly shown in FIG. 8, no attempt having been made to illustrate the relative size of these components.

FIG. 10 is similar to FIGS. 7–9 except that the tree-felling assembly is shown in a raised or "folded back" position. In this view the drive sprocket 65 mounted beneath the mounting plate 58 is shown more clearly.

POSSIBLE MODIFICATIONS

Although the shear blade member and the saw chain member are shown as being mounted on the same pivotal axis, these members could each be mounted on its own separate axis. Whereas the shear blade member is shown as having a straight edge, no invention would be involved in providing the blade with a curved, toothed, serrated or undulating edge. Although the shear blade member is shown as being moved by a hydraulic cylinder and piston, other means for moving the blade could be used, or a plurality of cylinders and pistons could be used. Further, it would not involve invention to have the shear blade member and/or the saw chain member move through a path other than an arcuate path. Whereas the shear blade member and the saw chain member are both shown as being mounted in and on the same supporting frame, no invention would be involved in mounting these members on separate frames so long as the separate frames still permitted sequential and/or cooperative movement of these cutting members in the felling of a tree. If the shear blade member and the saw chain members are mounted in different frames, it is possible to construct the frame for the saw chain member so that it can move through a limited arc, either independently or in response to a sudden force (such as the battering that might result from the bouncing end of a toppled tree) and when the saw chain member is mounted within such a frame and/or protective jaw, the arc through which the protective jaw may move or be moved can be governed by a number of mechanisms (such as a piston and cylinder, a heavy spring, a shock absorber, etc.).

What is claimed is:
1. A tree-felling device comprising:
   a. a shear blade member
   b. a saw chain member,
   c. said shear blade member and said saw chain member being mounted for movement toward and away from each other through either the same plane or parallel planes,
   d. said shear blade member and said saw chain member in their most distant positional relationship providing a tree-receiving space therebetween for the reception of a tree trunk that will be within the operative cutting range of said shear blade member and said saw chain member,
   e. protective housing means for said saw chain member,
   f. a first power means for moving said saw chain member out of said protective housing into said tree-receiving space and for retracting said saw chain member back into said protective housing, and
   g. a second power means for moving said shear blade member toward and away from said saw chain member.